United States Patent
Torii

(10) Patent No.: US 7,363,641 B2
(45) Date of Patent: Apr. 22, 2008

(54) ALIGNING DEVICE, FOR A DISK RECORDING MEDIUM, HAVING A SLIDING PORTION DISPOSED BETWEEN THE MEDIUM AND TURNTABLE GUIDE PORTION

(75) Inventor: Shinnosuke Torii, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 402 days.

(21) Appl. No.: 10/957,838

(22) Filed: Oct. 5, 2004

(65) Prior Publication Data
US 2005/0081228 A1 Apr. 14, 2005

(30) Foreign Application Priority Data
Oct. 14, 2003 (JP) ............................. 2003-353985

(51) Int. Cl.
*G11B 17/022* (2006.01)
(52) U.S. Cl. ................. 720/704; 360/99.05; 360/99.12
(58) Field of Classification Search ................ 720/704; 360/99.05, 99.12
See application file for complete search history.

(56) References Cited

U.S. PATENT DOCUMENTS

| | | | | |
|---|---|---|---|---|
| 4,570,256 A | * | 2/1986 | Tamaru | ...................... 720/704 |
| 4,649,531 A | * | 3/1987 | Horowitz et al. | ........... 720/704 |
| 4,747,002 A | * | 5/1988 | Takikawa et al. | ........ 360/99.05 |
| 2003/0020341 A1 | | 1/2003 | Nagatsuka | |
| 2003/0161220 A1 | | 8/2003 | Ishii | |
| 2004/0047247 A1 | | 3/2004 | Johnson | |
| 2006/0195855 A1 | * | 8/2006 | Sugiyama et al. | .......... 720/704 |

FOREIGN PATENT DOCUMENTS

JP 2003036585 2/2003

* cited by examiner

*Primary Examiner*—A. J. Heinz
(74) *Attorney, Agent, or Firm*—Fitzpatrick, Cella, Harper & Scinto

(57) ABSTRACT

An aligning device for a disk recording medium capable of reducing eccentricity using a simple structure, without an increase in cost, is provided. An aligning member has a tapered portion that contacts with a center hole of a disk, and fits with a guide portion that is fixed to a turntable with a sliding gap therebetween. The sliding gap between the aligning member and the guide portion is formed such that a leading end side sliding gap of the turntable in the sliding direction of the aligning member differs from a trailing end side sliding gap of the disk side in the sliding direction. The leading end side sliding gap is formed smaller than the trailing end side sliding gap. The amount of eccentricity of the disk becomes smaller according to this structure.

4 Claims, 10 Drawing Sheets

AMOUNT OF ECCENTRICITY p-p(μm)

|     | CROSS SECTION SHAPE K1 | CROSS SECTION SHAPE K2 |
| --- | --- | --- |
| (1) | 44 | 49 |
| (2) | 22 | 27 |
| (3) | 66 | 71 |

ALIGNING DEVICE, FOR A DISK RECORDING MEDIUM, HAVING A SLIDING PORTION DISPOSED BETWEEN THE MEDIUM AND TURNTABLE GUIDE PORTION

BACKGROUND OF THE INVENTION

1. Field of the Invention

The present invention relates to an aligning device for a disk recording medium such as a Mini Disc (MD), CD, or DVD, and to an information recording/reproducing apparatus in which this type of aligning device is mounted.

2. Related Background Art

Alignment of an optical disk and a rotation shaft of an information recording/reproducing apparatus is conventionally performed by using an aligning member that is provided to a spindle motor that rotationally drives the optical disk. FIG. 10 shows a specific spindle motor that is mounted in a disk drive such as a recordable MD. It should be noted that the disk aligning structure shown in FIG. 10 is disclosed, for example, in Japanese Patent Application Laid-open No. 2003-036585, which was proposed by the applicants of the present invention.

A spindle motor 30 includes a rotor portion 32 that is rotatably supported with respect to a stator portion 31 that is fixedly disposed. The stator portion 31 comprises a stator substrate 33; a housing 34 that is attached to the stator substrate 33; coils 35 that is fixedly disposed surrounding the housing 34 from an outer circumference of the housing 34; and a sliding bearing 36 that is press-inserted and held within the housing 34.

On the other hand, the rotor portion 32 comprises a rotation shaft 37 that is rotatably supported by the sliding bearing 36; a turntable 38 that is attached to the rotation shaft 37; a cylindrical rotor yoke 39 that is attached to the turntable 38 and surrounds the coils 35 from an outer circumference of the coils 35, with a lower end of the cylindrical rotor yoke 39 not connected; a rotor magnet 40 that is provided on an inner side of the rotor yoke 39; an attraction magnet 41 that is provided to an upper surface of the turntable 38; an adjusting member 42 that fits into a turntable cylindrical portion 38a; a regulating member 43 that regulates an upward range of movement for the adjusting member 42; and an urging member 44 that urges the adjusting member 42 upward with respect to the turntable 38.

In addition, a disk 45 is set onto the turntable 38. A fixing disk 46 is mounted from above the disk 45, and a magnetic attraction force of the attraction magnet 41 of the rotor portion 32 pulls the fixing disk 46. The disk 45 is thus mounted onto the turntable 38. A center hole lower edge 45a of the disk 45 contacts with a tapered surface 42a of the aligning member 42 at this point. The aligning member 42 is pressed down in a downward direction against a force of the urging member 44, and the disk 45 is mounted onto the turntable 38 while aligned substantially coaxially with the rotation shaft 37. It should be noted that the urging member 44 is provided in order to respond to tolerance fluctuation of the center hole diameter of the disk 45.

Problems develop if the aligning member 42 is fixed. Fluctuation of the center hole diameter of the disk 45 cannot be tracked. The disk 45 cannot be mounted to the turntable 38 for cases where the center hole diameter is a minimum, and the disk is not aligned when lash with respect to the aligning member 42 becomes large for cases in which the center hole diameter is a maximum. It should be noted that a compression coil spring having a circular cross section is employed for the urging member 44 in the conventional example in order to prevent collapse of the coil when compressed.

The conventional spindle motor 30 is thus configured. A magnetic field that develops in the coils 35 due to suitable electrification of the coils 35 acts in concert with a magnetic field due to the rotor magnet 40 and the rotor yoke 39 of the rotor portion 32. The rotor portion 32 is thus rotationally driven. It thus becomes possible for the disk 45 mounted on the turntable 38 to rotate in synchronism with the rotation of the rotor portion 32 without sliding owing to the attractive force of the attraction magnet 41.

Further, for cases where information is recorded onto or reproduced from the disk 45, it is necessary to accurately align tract positions of the disk 45 with pickup positions that record and reproduce information. In particular, the track positions vary in a radial direction of the disk according to the amount of eccentricity within one disk rotation for cases where eccentricity occurs with the disk 45. For example, a 1.6 μm pitch bit signal is accurately traced and detected for CD reproduction. Positioning is conventionally performed in the radial direction of the disk by using a tracking servo, for example, in order to accurately adjust the pickup positions.

The narrowing of track pitch accompanying higher information density, and the increase in disk rotational velocity accompanying higher transfer rates have been advancing in recent disk recording/reproducing apparatuses. Accordingly, the positioning accuracy of the tracking servo described above demands higher precision and higher speed. However, it is obvious that control at higher precision and higher speed is difficult with the current conventional tracking servo operating range. The operating range of the tracking servo is also tending to become smaller, and therefore it has to be accomplished to reduce the amount of eccentricity.

With publicly disclosed apparatuses, the tolerance fluctuation of the center hole of the disk is made negligible, and high precision alignment is performed, by using a configuration as described above. That is, it is possible for an aligning member that fits into a guide portion of a turntable on which a disk is mounted, the aligning member having a tapered surface contacting with a center hole of the disk, to slide in a rotation shaft direction of the turntable. However, it is necessary to have a 5 to 20 μm pp sliding gap for a sliding portion because of ambient temperatures, differences in material properties, finishing accuracy, and the like. Accordingly, there is a problem in that the angle of the tapered surfaces changes because the aligning member inclines due to the sliding gap, and eccentricity develops during disk mounting.

In addition, when considering hole fitting of the sliding portion and the guide portion shapes, it is necessary to impart a tolerance fluctuation on the order of 5 to 10 μm to each of the diameter dimensions due to fabrication problems. Accordingly, even with identical designs, the sliding gap described above will have a lash range between the maximum value and the minimum value due to the tolerances of the sliding portion and the guide portion. For example, the sliding gap becomes from 5 to 20 μm when the tolerance of the guide portion is from −10 to 0 μm, and the tolerance of the sliding portion is from +5 to +10 μm.

Further, with these high precision dimensional tolerances, not only is there fluctuation between each component, but the dimensions also change, for example, within the tolerance fluctuation described above for the sliding portion of one individual component. Accordingly, the eccentricity that develops from the incline of the aligning member changes greatly because there is a range in the sliding gap. However, in order to maintain a constant sliding gap, work for further reducing the tolerance fluctuation of the components, selecting each component by inspecting its dimensions, and the like becomes necessary, and there is a problem in that this work leads to higher costs.

SUMMARY OF THE INVENTION

The present invention has been made in order to resolve problems like those described above. An object of the present invention is to provide an aligning device for a disk recording medium and an information recording/reproducing apparatus which makes it possible to reduce the amount of eccentricity of the disk recording medium by using a simple configuration, without an increase in cost.

According to the present invention, there is provided an aligning device for a disk recording medium, the aligning device including: a turntable on which the disk recording medium is placed; a rotation shaft that rotates the turntable; and an aligning member that contacts with a center hole of the recording medium and aligns the center of the rotation shaft and the center of the recording medium; wherein the aligning member fits with a guide portion that is fixed to the turntable with a sliding gap therebetween; wherein the sliding gap is formed such that a leading end side sliding gap on a turntable side in a sliding direction of the aligning member differs from a trailing end side sliding gap on a disk recording medium side in the sliding direction; and wherein the leading end side sliding gap is formed smaller than the trailing end side sliding gap.

According to the present invention, there is provided an information recording/reproducing apparatus comprising: a spindle motor for rotating a disk recording medium; the aligning device described above that is installed on the spindle motor; and an optical pickup for irradiating the rotating recording medium with an optical beam.

DESCRIPTION OF THE PREFERRED EMBODIMENTS

Figure 10:
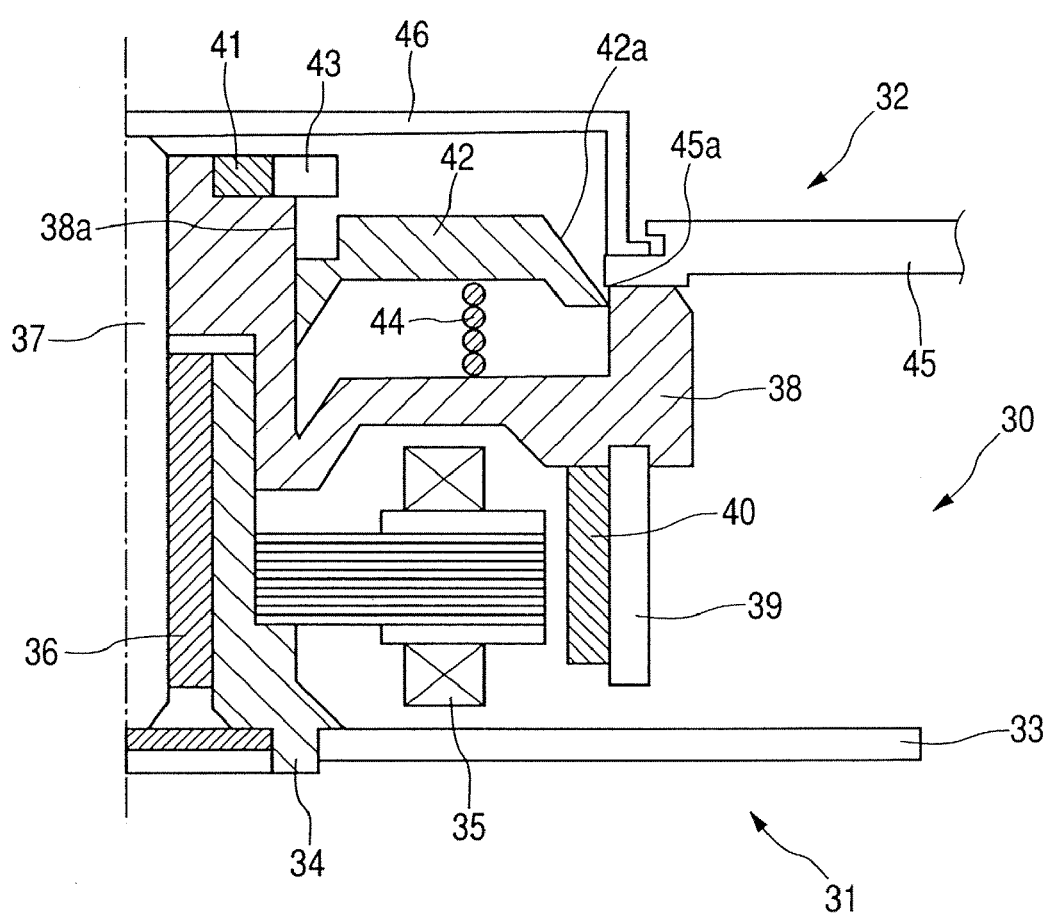
FIG. 10 is a schematic cross sectional view that shows a conventional aligning device.

Preferred embodiments for implementing the present invention, with specific dimensional values, are explained in detail next. It should be noted that only important points of the present invention are extracted and shown in the embodiments described below. Specific structures of other elements not shown are identical to those of the conventional example of FIG. 10. That is, the present invention is especially characterized by an alignment structure according to an aligning member, and the basic configuration except such structure is similar to that of FIG. 10.

Embodiment 1

Figure 1A:
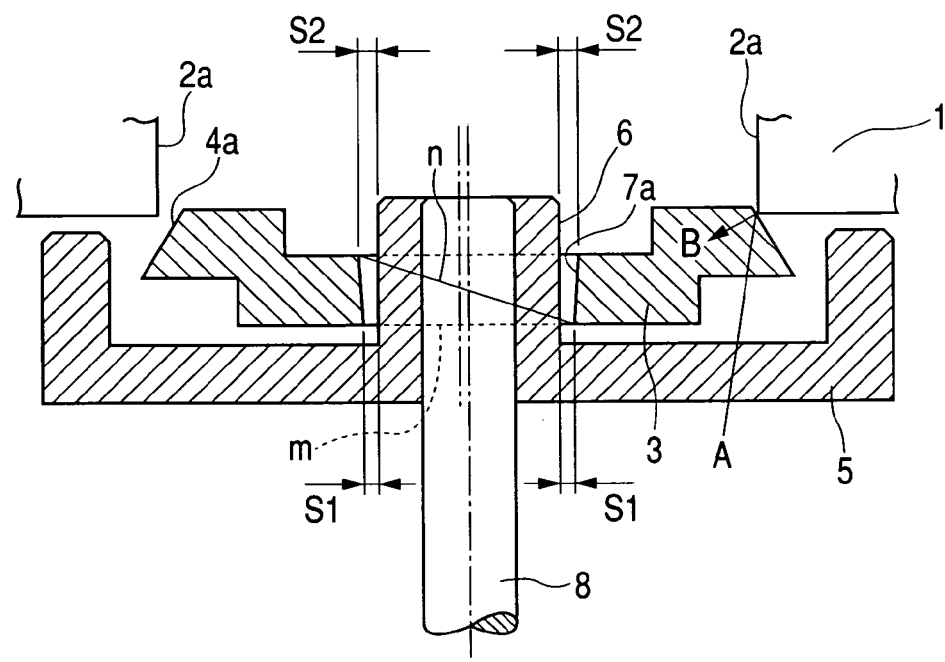
FIGS. 1A and 1B are schematic cross sectional views that show an aligning device according to a first embodiment of the present invention.
Figure 1B:
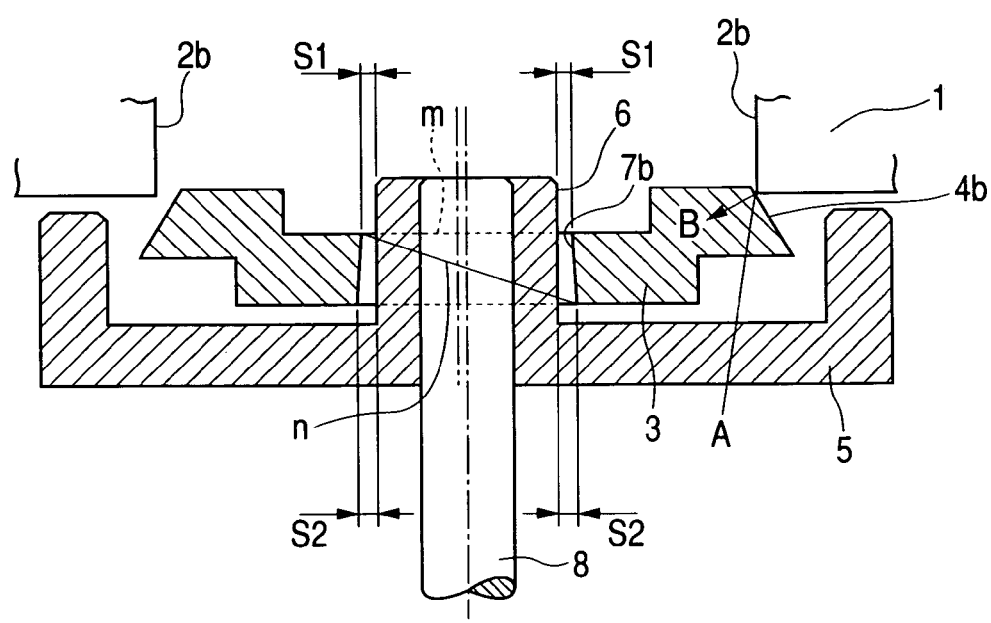

FIGS. 1A and 1B are schematic cross sectional views that show a first embodiment of the present invention. FIGS. 1A and 1B show significant forms of sliding gaps that can be formed due to tolerance fluctuation as described above. It should be noted that FIG. 1A is a cross sectional view that shows a case of a cross sectional shape K1 of an aligning member 3 according to this embodiment (where the diameter of an upper end surface thereof is greater than the diameter of a lower end surface thereof in a portion that slides along a guide portion 6). Further, for comparison, FIG. 1B shows a case of a cross sectional shape K2 of the aligning member 3 (where the diameter of the lower end surface thereof is greater than the diameter of the upper end surface thereof in the portion that slides along the guide portion 6).

An alignment object disk, such as a Mini Disc (MD), CD, or DVD is shown in FIGS. 1A and 1B. Reference numerals 2a and 2b denote center holes of respective disks 1 for the cross sectional shapes K1 and K2, reference numeral 3 denotes aligning members, and reference numerals 4a and 4b denote tapered portions that respectively contact with the center holes 2a and 2b of the disks 1 of the aligning members 3. Reference numeral 5 denotes a turntable, and reference numeral 6 denotes a guide portion that is formed integrally with the turntable 5. Reference numerals 7a and 7b denote a sliding portion of the fitting aligning member 3 that fits with the guide portion 6 of each of the cross sectional shapes K1 and K2. The sliding portions 7a and 7b each have a minimum sliding gap S1 and a maximum sliding gap S2. Reference numeral 8 denotes a rotation shaft that is integrally fastened to the turntable 5. The aligning member 3 urges the disk 1 side by using an urging member, similar to the case of FIG. 10.

It should be noted that, for simplicity in this embodiment, the sliding gap between the aligning member 3 and the guide portion 6 is made into a trapezoidal cross sectional shape with respect to the rotation shaft, while the specific structure except such gap and alignment method conform to conventional examples. Further, the aligning member 3 slides in a downward direction in the drawings when aligning in this embodiment. Accordingly, the term "leading end side sliding gap" as used herein means a sliding gap between the diameter of the lower end surface and the guide portion 6, and the term "trailing end side sliding gap" as used herein means a sliding gap between the diameter of the upper end surface and the guide portion 6.

The aligning member 3 is pressed in the direction of an arrow B and rotates, inclining until engaging with the guide portion 6, when the center holes 2a and 2b of the disks 1 contact with the tapered portions 4a and 4b of the aligning members 3, respectively, at points A in FIGS. 1A and 1B. Engagement occurs in two ways. For case (1), engagement occurs at reference symbols m in the figures, that is, at the lower base of the shape K1 of FIGS. 1A, and at the upper base of the shape K2 of FIG. 1B. For case (2), engagement occurs with respect to a diagonal line n.

First, the case (1) of engagement with respect to the line segments m (the lower bases with the cross sectional shape K1, and the upper base with the cross sectional shape K2) is discussed.

Figure 2A:
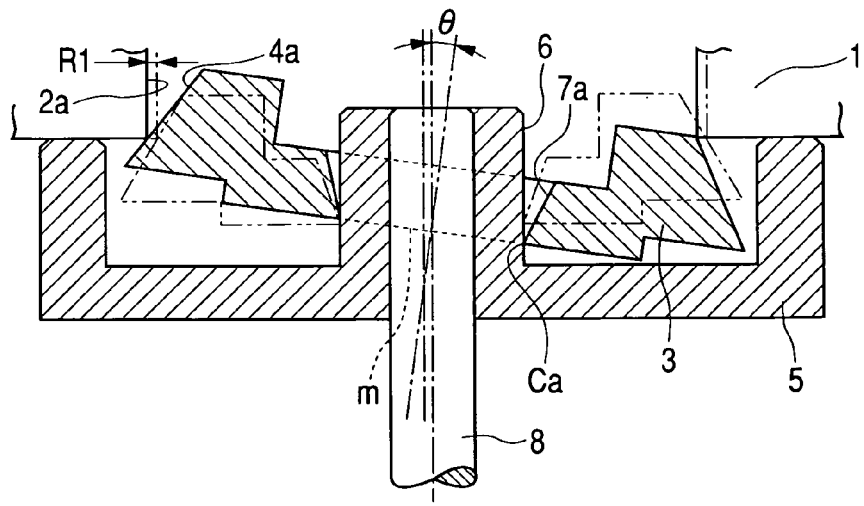
FIGS. 2A, 2B and 2C are schematic cross sectional views for explaining meshing between an upper base portion and a lower base portion of the first embodiment of the present invention.
Figure 2B:
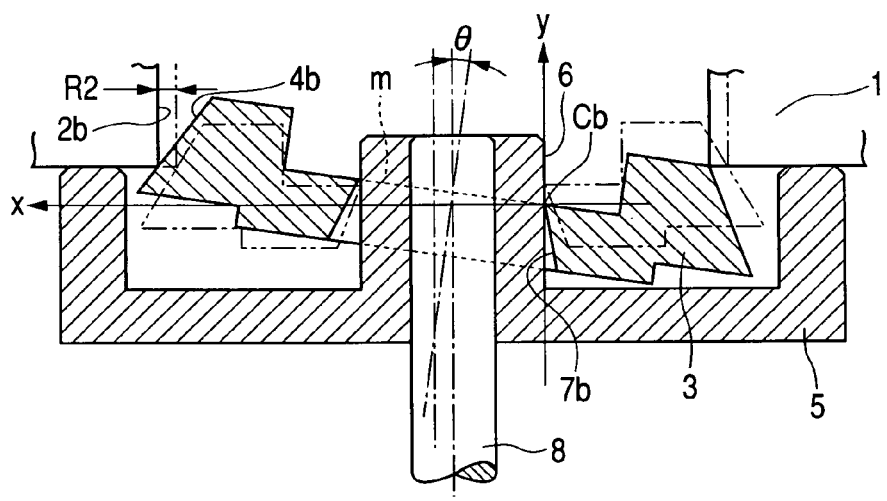
Figure 2C:
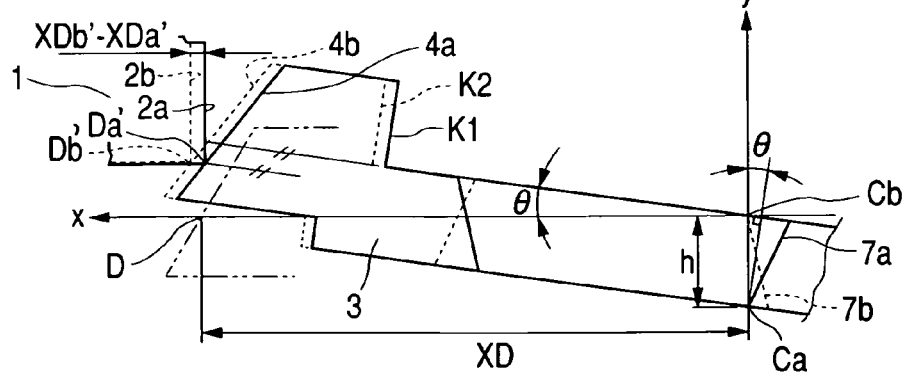

FIG. 2A shows the cross sectional shape K1, and FIG. 2B shows the cross sectional shape K2 for this case. Points Ca and Cb in FIGS. 2A and 2B are rotation centers for the cross sectional shapes K1 and K2, respectively. From FIGS. 2A and 2B, it can be understood that an amount of eccentricity R1 for the cross sectional shape K1 is less than an amount of eccentricity R2 for the cross sectional shape K2. Reasons for this result are explained using FIG. 2C. FIG. 2C is a diagram that schematically shows the rotation centers Ca and Cb of FIGS. 2A and 2B, respectively, and a point D that is described hereinafter. As shown in FIG. 2B, the x-axis and the y-axis are set by taking the rotation center Cb as an origin when the cross sectional shape K2 contacts with the guide portion 6.

Further, the rotation center Ca when the cross sectional shape K1 contacts with the guide portion 6 is on the y-axis. Accordingly, an upper surface portion and a lower surface portion (not shown) of the aligning members 3 of the cross sectional shapes K1 and K2 are moved in parallel along the y-axis and disposed so that they coincide after inclining. It should be noted that, in FIG. 2C, the tapered portions 4a and 4b before inclination that contact with the guide portion 6 when the rotation centers of the cross sectional shapes K1 and K2 move in parallel are shown by a double dotted line, the cross sectional shape K1 after inclination is shown by a solid line, and the cross sectional shape K2 after inclination is shown by a broken line.

A state where a center line (not shown) of the aligning member 3 before inclination and a center line (not shown) of the guide portion 6 coincide with each other is taken as an initial state. The amounts of movement from the initial state along the x-axis until the rotation centers Ca and Cb contact with the guide portions 6 are identical at a minimum gap S1. Accordingly, the tapered portion before inclination, shown by the double dotted line, is disposed in the same position for both the cross sectional shapes K1 and K2.

Further, the line segments m have identical lengths in the cross sectional shapes K1 and K2, and the line segments m before inclination are parallel to the x-axis. Accordingly, rotational angles θ until engagement occurs after contact with the guide portions 6 are identical, without being limited to the cases of the cross sectional shapes K1 and K2. Accordingly, points of contact between the tapered portions 4a and 4b, and the center holes 2a and 2b of the disks 1 during alignment after inclination become points on the same coordinates with a relative coordinate system of the aligning members 3 of the cross sectional shapes K1 and K2 (for example, coordinate systems in which the lower end of the tapered portions 4a and 4b are taken as origins).

In FIG. 2C, a point where a straight line formed between the tapered portions 4a and 4b of the aligning members 3 before inclination, shown by the double dotted line in FIG. 2C, intersects the x-axis is taken as a point D. The point D after inclination in the cross sectional shape K1 is taken as a point Da', and the point D after inclination in the cross sectional shape K2 is taken as a point Db'. It then becomes possible to compute an alignment performance difference R2−R1 between the cross sectional shape K1 and the cross sectional shape K2 by computing the x-axis distance between the point Da' and the point Db'.

The distance between the rotation centers Ca and Cb is taken as h, and the distance between a line segment Cb and the point D is taken as XD. From FIG. 2C, an x-coordinate distance XDa' of the point Da' and an x-coordinate distance XDb' of the point Db' are computed from the following equations.

$$XDa' = (XD - h \cdot \sin\theta) \cdot \cos\theta \quad (1\text{-}1)$$

$$XDb' = XD \cdot \cos\theta \quad (1\text{-}2)$$

Accordingly, the difference between XDa' and XDb' becomes the difference in the amount of eccentricity R2−R1 between the cross sectional shape K1 and the cross sectional shape K2.

$$R2 - R1 = XDb' - XDa' = h \cdot \sin\theta \cdot \cos\theta \quad (1\text{-}3)$$

In Eq. (1-3), h is greater than zero. When taking a clockwise direction in FIG. 2C as a positive direction, the rotational angle θ is greater than zero because the rotation direction does not reverse. Further, rotation of the aligning member does not equal or exceed 90° in practice due to the structure used, and the rotation angle θ therefore lies in a range of 0<θ<90°. Accordingly, sin θ>0, and cos θ>0 (0<θ<90°), and Eq. (1-3) becomes positive.

It becomes clear from the above explanation that the case of the cross sectional shape K1 according to this embodiment, where the diameter of the upper end surface is greater than the diameter of the lower end surface, has a smaller amount of eccentricity than the case of the cross sectional shape K2, where the diameter of the lower end surface is greater than the diameter of the upper end surface.

The case (2) of engagement with respect to the diagonal line n is explained.

Figure 3A:
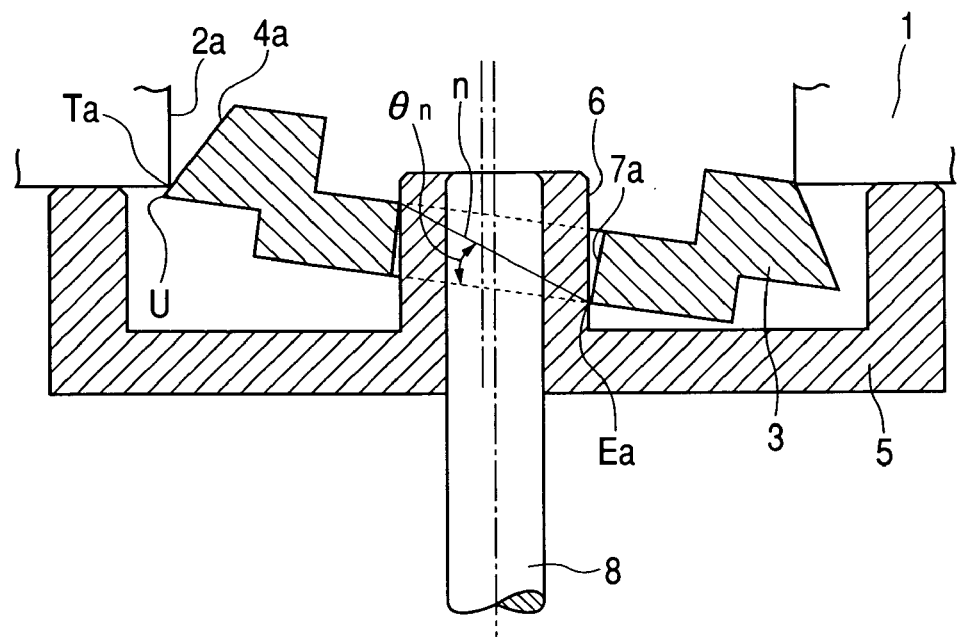
FIGS. 3A and 3B are schematic cross sectional views for explaining meshing according to a diagonal line of the first embodiment of the present invention.
Figure 3B:
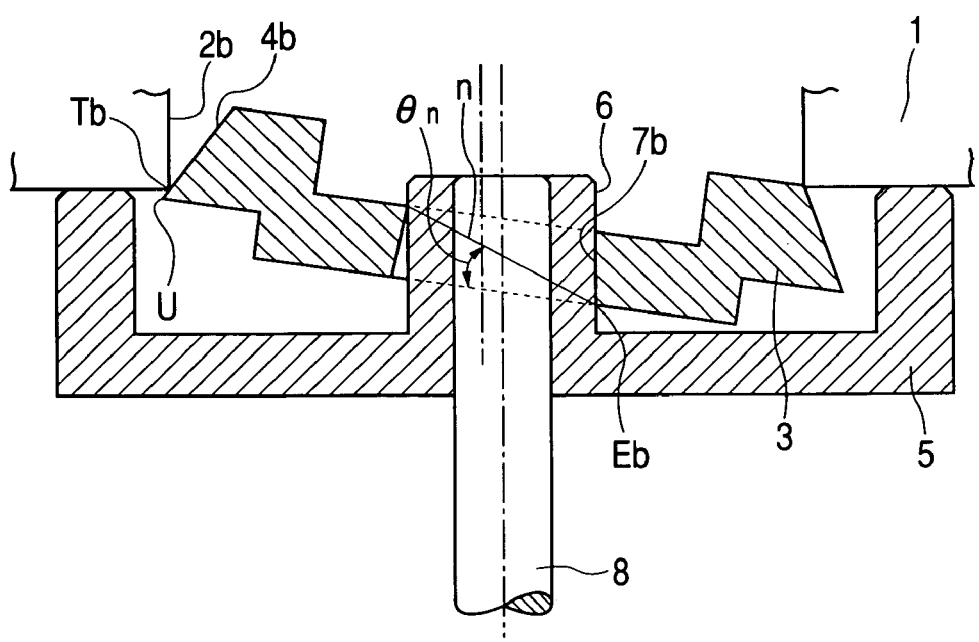

Engagement with respect to the diagonal line n is explained in detail below using FIGS. 3A, 3B, 4A, 4B, and 5. First, a state where engagement takes place at both ends at the diagonal line n is shown in FIGS. 3A and 3B. FIG. 3A shows the state of the cross sectional shape K1, and FIG. 3B shows the state of the cross sectional shape K2. In FIGS. 3A and 3B, points Ea and Eb are rotation centers of the cross sectional shape K1 and the cross sectional shape K2 respectively. Points Ta and Tb are contact portions between the center holes 2a and 2b of the disks 1 and the tapered portions 4a and 4b for the cross sectional shapes K1 and K2, respectively, during alignment (only left side cross sectional views of the rotation shaft are shown in the figures).

It should be noted that the length of the diagonal lines n are equal for the cross sectional shape K1 and the cross sectional shape K2, and that angles θn, which indicate angles formed by the diagonal lines n and a direction orthogonal to the rotation shaft (angles formed by the diagonal lines n and a horizontal direction in the figures), are also equal. Accordingly, the rotation angles θ (noted in FIG. 5) until the cross sectional shapes K1 and K2 becomes in engagement are also identical. The contact positions are therefore also identical in relative coordinate systems that take the aligning member 3 as a reference when aligning the center holes 2a and 2b of the disks 1 in the cross sectional shapes K1 and K2 (for example, coordinate systems for cases of using lower end points U of the tapered portions 4a and 4b as origins).

Processes until engagement occurs with respect to the diagonal lines n are considered next for the trapezoidal cross sectional shapes K1 and K2 described above. The processes are separated into two movements: (i) translation motion of the aligning member 3 in a direction that is orthogonal to the rotation shaft, and (ii) rotation.

Figure 4A:
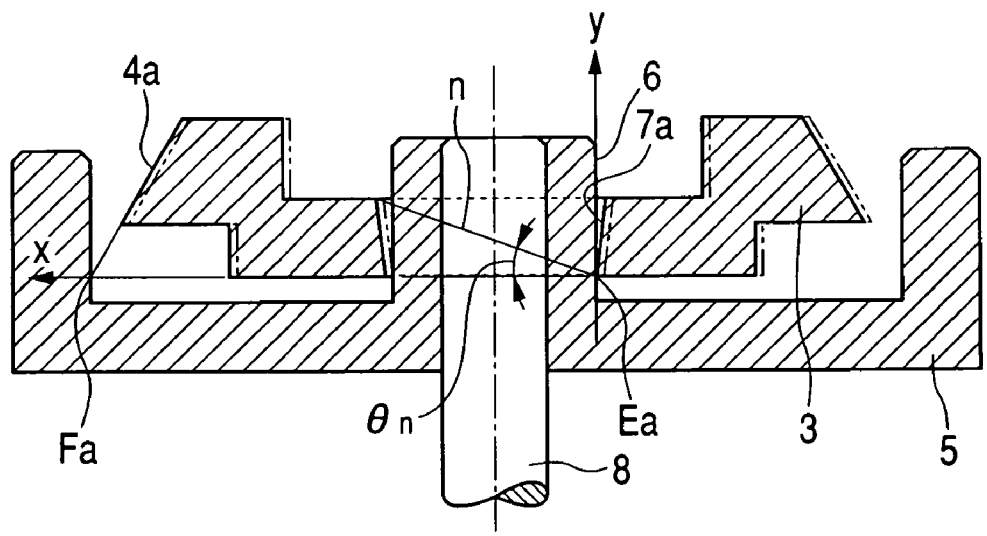
FIGS. 4A and 4B are schematic cross sectional views that show translation motion from among operations leading to meshing according to the diagonal line of FIGS. 3A and 3B.
Figure 4B:
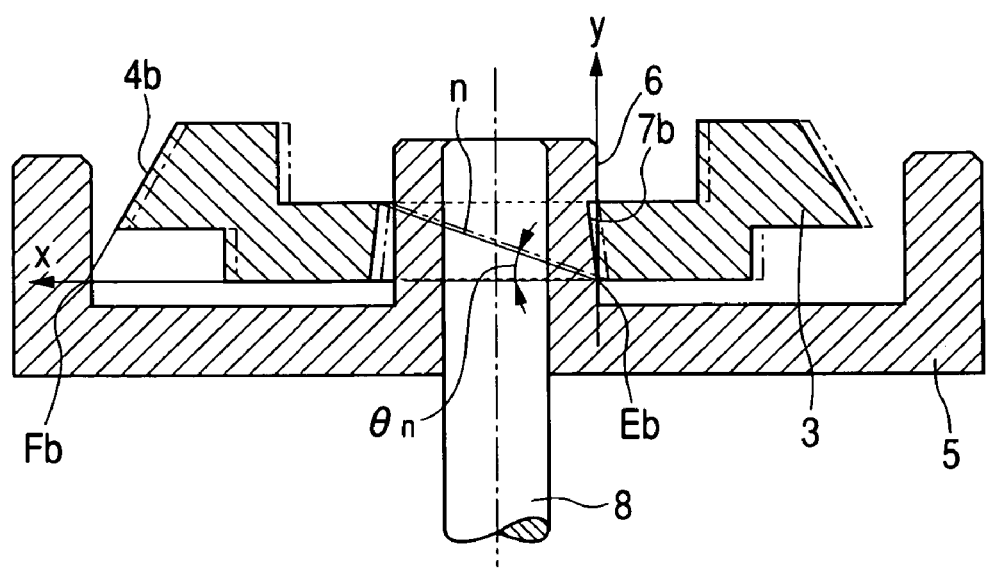

FIGS. 4A and 4B show the case of (i) translation motion of the aligning member 3 in a direction that is orthogonal to the rotation shaft. In FIGS. 4A and 4B, the disk 1 is omitted. FIG. 4A shows the case of the cross sectional shape K1, while FIG. 4B shows that of the cross sectional shape K2. States before translation motion are shown by double dotted lines. States where the aligning members 3 translate in the direction orthogonal to the rotation shaft (the x-axis direction) until rotation centers Ea and Eb of FIGS. 3A and 3B, respectively, contact with the guide portions 6 are shown by solid lines.

It should be noted that each symbol, including the rotation centers Ea and Eb, are given for states after translation motion (shown by the solid lines). Taking the rotation centers Ea and Eb as origins, the x-axis is set in the direction that is orthogonal to the rotation shaft, and the y-axis is set in the direction parallel to the rotation shaft.

Taking points where straight lines formed by the tapered portions 4a and 4b intersect with the x-axis as points Fa and Fb, respectively, and taking the x-axis coordinates at the points Fa and Fb as XFa and XFb, the following equation results.

$$XFb - XFa = S2 - S1 \qquad (2\text{-}1)$$

Figure 5:
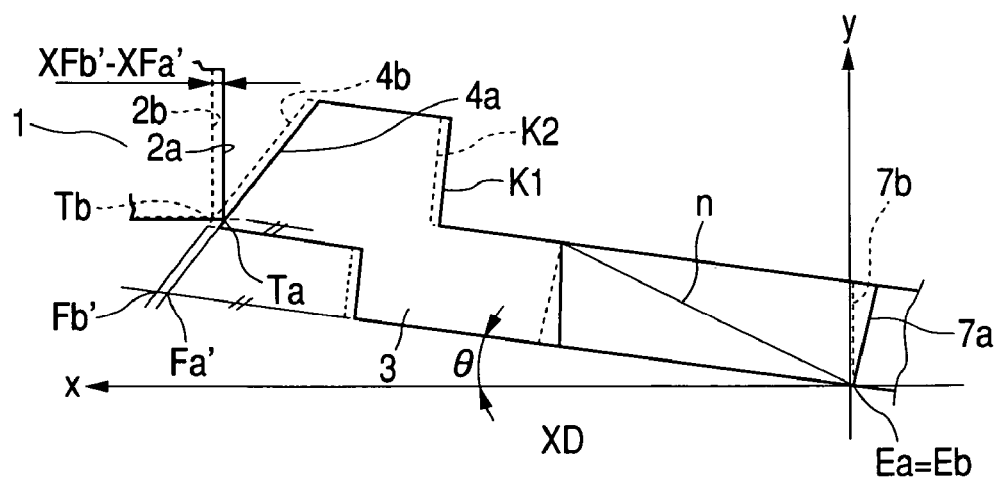
FIG. 5 is a schematic cross sectional view for explaining a difference in eccentricity amount by cross sectional shape of the meshing according to the diagonal line of FIGS. 3A and 3B.

Next, FIG. 5 shows the rotation case. FIG. 5 is a diagram that shows a state where the rotation centers Ea and Eb of the cross sectional shapes K1 and K2, respectively, are made to coincide with each other as an origin point, and rotated until engagement occurs at both ends of the diagonal lines n. When points Fa and Fb after inclination are taken as Fa' and Fb', respectively, and the distances in the x-axis direction of the points Fa' and Fb' are taken as XFa' and XFb', respectively, a line segment TaTb and a line segment Fa'Fb' become parallel. Accordingly, XFb'−XFa' becomes the difference in the amount of eccentricity between the cross sectional shapes K1 and K2, similar to the case (1) described above. The following equation thus results.

$$\begin{aligned} XFb' - XFa' &= XFb \cdot \cos\theta - XFa \cdot \cos\theta \\ &= (S2 - S1) \cdot \cos\theta \end{aligned} \qquad (2\text{-}2)$$

S2−S1>0 here, the rotation angle θ lies within the range 0<θ<90° for reasons similar to those of the case (1). Accordingly, cos θ>0, and Eq. (2-2) becomes positive.

From the above descriptions, the cross sectional shape K1 case (where the diameter of the upper end surface is greater than the diameter of the lower end surface) has a smaller amount of eccentricity than the cross sectional shape K2 case (where the diameter of the lower end surface is greater than the diameter of the upper end surface).

Figure 6A:
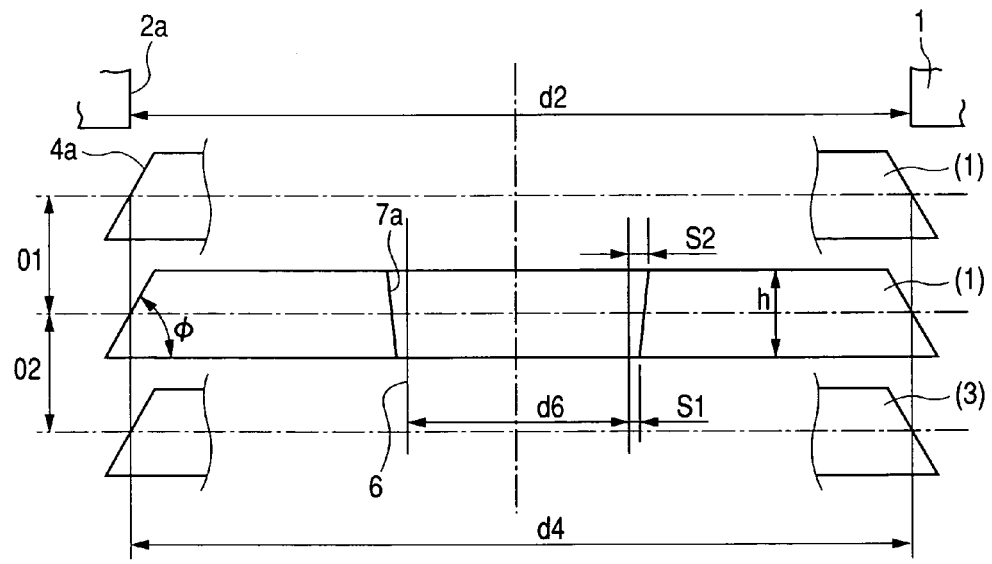
FIGS. 6A and 6B are schematic cross sectional views for explaining dimensional values for specific analysis of the first embodiment.
Figure 6B:
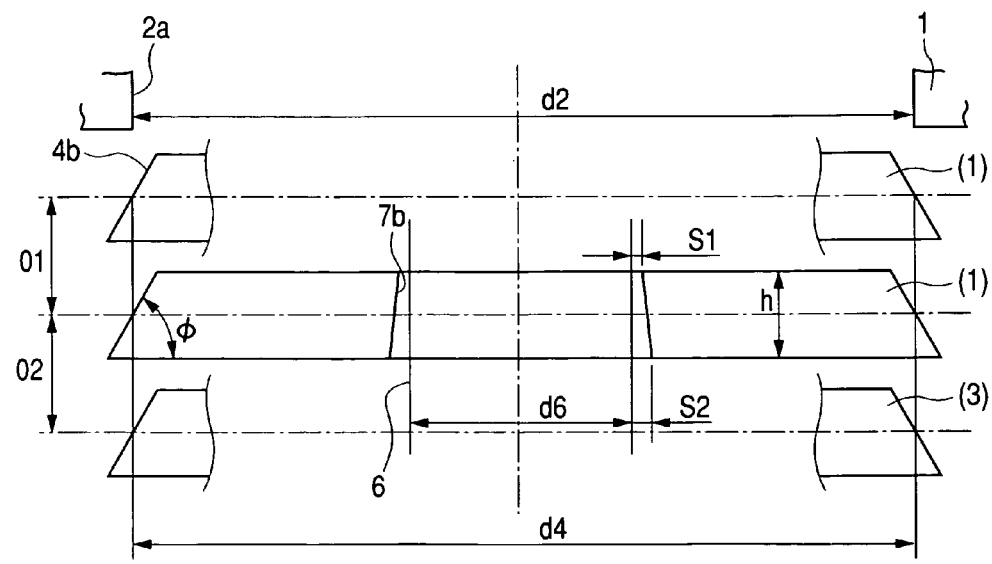

Specific analytical results are explained next using FIGS. 6A and 6B. FIGS. 6A and 6B are diagrams in which the tapered portions 4a and 4b are disposed in three different positions, <1> above, <2> at the same height of, and <3> below the sliding portions 7a and 7b, respectively, in the cross sectional shapes K1 and K2. It should be noted that engagement of the aligning members 3 by inclination is in the case (2) of engagement with respect to the diagonal lines n.

Dimensional parameters are taken as follows. The diameter d6 of the guide portion 6 is 6.5 mm, the minimum sliding gap S1 is 2.5 μm, the maximum sliding gap S2 is 7.5 μm, the height of the sliding portion h is 1 mm, a taper angle φ is 60°, a taper portion reference diameter (diameter of a center portion of the taper) d4 is 11 mm, and a disk center hole diameter d2 is 11 mm. Taking the case <2> where the height of the tapered portions are the same as the height of the sliding portions, as a reference, an offset O1 for the case <1> is 1.5 mm above, and an offset O2 for the case <3> is 1.5 mm below.

Figures 7, 8:
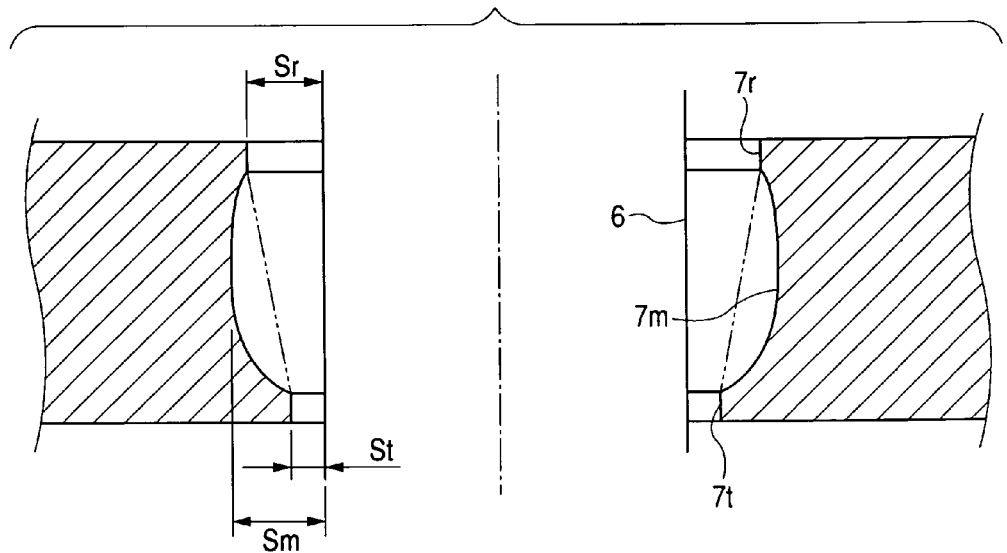
FIG. 7 is a diagram that shows results of analyzing the first embodiment.
FIG. 8 is a schematic cross sectional view that shows a variation of the first embodiment.

FIG. 7 shows analytical results. As can be understood from FIG. 7, it has been confirmed that the amount of eccentricity for the cross sectional shape K1 of the sliding portion (where the diameter of the upper end surface is greater than the diameter of the lower end surface) is less than that for the cross sectional shape K2 (where the diameter of the lower end surface is greater than the diameter of the upper end surface) for identical placements of the tapered portion. Further, the difference in the eccentricity amounts for each offset state all becomes 5 μm. With the above dimensional values, the rotation angle θ of the aligning member 3 is approximately 0.42°. Accordingly, substituting this into Eq. (2-2), the difference in the amount of eccentricity between the cross sectional shapes K1 and K2 becomes approximately 5 μm, matching with the analytical results described above.

It should be noted that the present invention is not limited to the shapes of this embodiment. For example, in practice chamfering is normally performed on both end portions of the upper surface side and the lower surface side of the sliding portion, and the cross sectional shapes are not strictly trapezoidal, that is, are not strictly tapered shapes. However, it becomes possible to obtain the effects of the present invention by setting the sliding gaps in portions to which chamfering is not implemented.

Further, as shown in FIG. 8, taking a portion 7m (gap Sm) that is sandwiched by a leading end side sliding portion 7t (sliding gap St with respect to the guide portion 6=minimum sliding gap S1) and a trailing end side sliding portion 7r (sliding gap Sr with respect to the guide portion 6=maximum sliding gap S2) with respect to the sliding direction when aligning the aligning member 3, it is also possible to form the gap Sm of the portion 7m larger than the sliding gap Sr of the trailing end side. It should be noted that, in this case, the sliding portion 7t of the leading end side and the sliding portion 7r of the trailing end side are tied together as shown by a double dotted line in FIG. 8. It is thus possible to also consider tapered shapes similar to the cross sectional shapes discussed above. Further, the contact surface area with the guide portion 6 of the sliding portion is reduced in this case, and it therefore becomes possible to reduce the sliding load.

Embodiment 2

Figure 9:
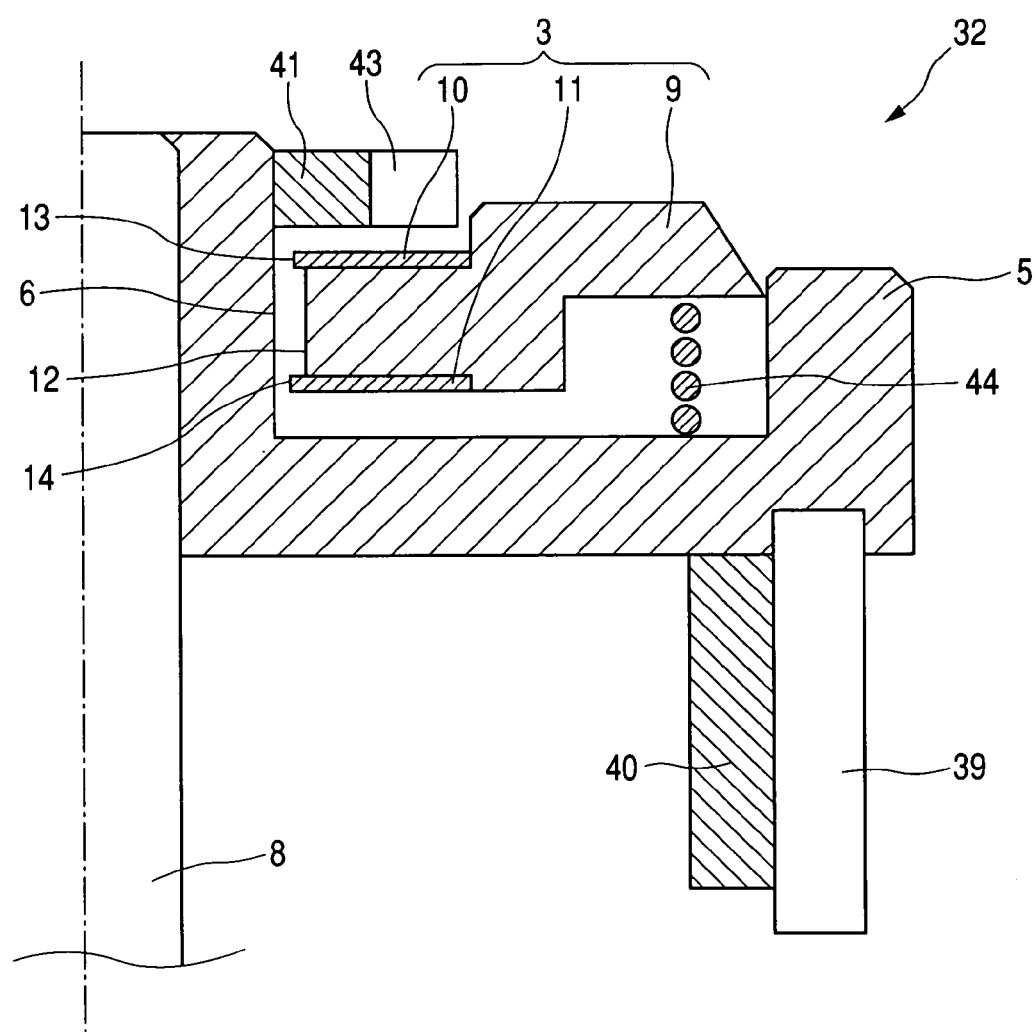
FIG. 9 is a schematic cross sectional view that shows an aligning device according to a second embodiment of the present invention.

FIG. 9 is a cross sectional view that shows a second embodiment of the present invention. It should be noted that reference symbols identical to those of the first embodiment and those of FIG. 10. are used in FIG. 9. In this embodiment, the aligning member 3 comprises a tapered member 9, an upper side sliding member 10 (a portion that forms trailing end side sliding gap), and a lower side sliding member 11 (a portion that forms a leading end side sliding gap). An inner diameter portion 12 of the tapered member 9 is larger than the sliding gaps, and also larger than the tolerance range. An upper side sliding portion 13 of the upper side sliding member 10 and a lower side sliding portion 14 of the lower side sliding member 11 are configured such that the inner diameter of the upper side sliding portion 13 is greater than the inner diameter of the lower side sliding portion 14. The leading end side sliding gap is thus smaller than the trailing end side sliding gap in the direction toward which the aligning member 3l slides.

By making the aligning member 3 into a separate unit, the structure thus becomes complex compared to that of the first embodiment. However, it is possible to reduce difficulty of component fabrication of the alignment member, although the dimensional precision and surface properties of both the tapered portion and the sliding portion are required to be satisfied in the first embodiment. In particular, the shape of the aligning member 3 demands high precision for outer diameter fabrication and inner diameter fabrication in the first embodiment. According to this embodiment, however, it becomes possible to distribute high fabrication precision portions according to components. The dimensional precision and the surface properties of the tapered portion of the tapered member 9 are determined by the outer diameter fabrication, and the dimensional precision and the surface properties of the upper side sliding member 10 and the lower side sliding member 11 are determined by the inner diameter fabrication. Further, it becomes possible to reduce the contact surface area with the guide portion 6 of the sliding portion. Accordingly, it becomes possible to reduce the sliding load due to frictional forces. It should be noted that it is also effective to configure the tapered member 9 and the upper side sliding member 10 by using the same member, and combine this with the lower side sliding member 11.

Embodiment 3

Figure 11:
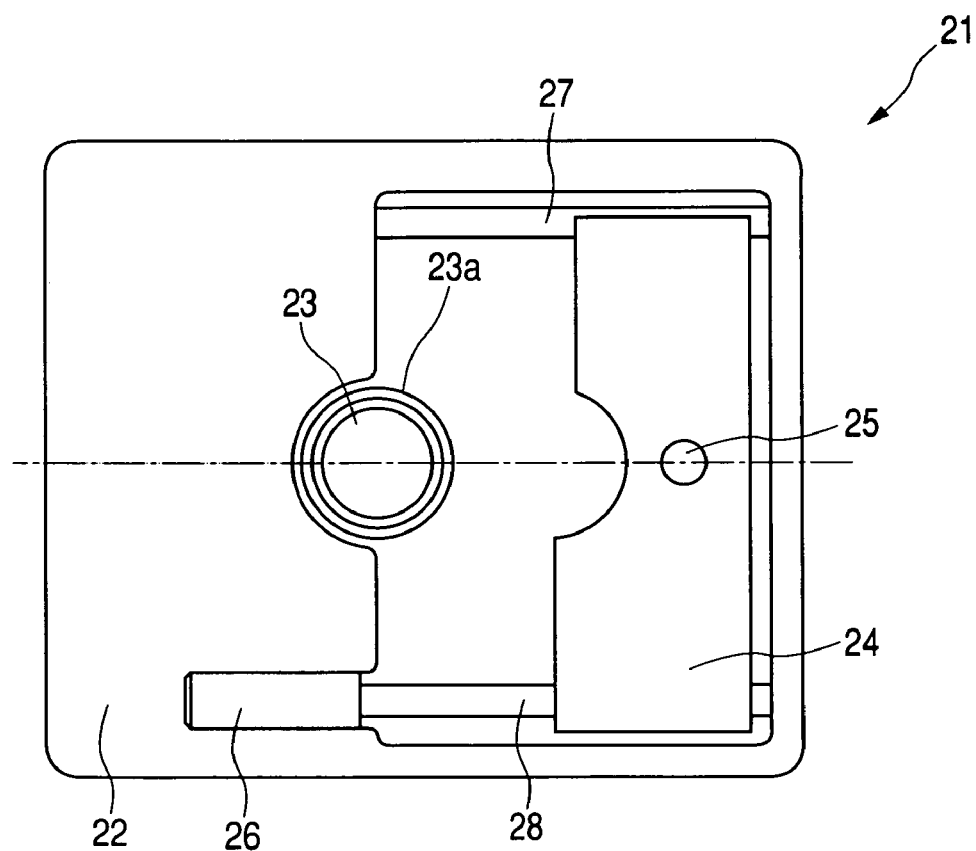
FIG. 11 is a schematic diagram that shows an information recording/reproducing apparatus of the present invention.

FIG. 11 is a schematic view that shows the structure of an information recording/reproducing apparatus of the present invention. An information recording/reproducing apparatus 21 comprises a chassis 22 that becomes a structural base, a spindle motor 23 that mounts and rotates a disk (not shown) disposed on the chassis 22, in which the aligning device shown in the first embodiment or the second embodiment is installed, an optical pickup 24, an objective lens 25 that radiates an optical beam and is disposed in the optical pickup 24, a feed motor 26 having a lead screw 28 that conveys the optical pickup 24 in a radial direction of the disk that is disposed on the chassis 22, and a guide shaft 27 that supports the optical pickup 24.

A light beam is radiated from the objective lens 25 of the optical pickup 24 to the disk 1 that is rotated by the spindle motor 23. Further, a lead screw 28 that is formed integrally with a rotation shaft of the feed motor 26 is engaged with the optical pickup 24 by a rack (not shown). By converting rotational motion of the lead screw 28 into translation motion, the optical pickup 24 moves in the radial direction of the disk 1 with the guide shaft 27 as a guide. The information recording/reproducing apparatus 21 thus performs information recording/reproducing to and from the disk 1.

This application claims priority from Japanese Patent Application No. 2003-353985 filed Oct. 14, 2003, which is hereby incorporated by reference herein.

What is claimed is:

1. An aligning device for a disk recording medium, comprising:
    a turntable on which the disk recording medium is placed;
    a rotation shaft that rotates the turntable;
    the turntable having an upstanding guide portion which is positioned generally concentrically with respect to the rotation shaft; and
    an aligning member that contacts a center hole of the recording medium and aligns a center of the rotation shaft with a center of the recording medium;
    wherein the aligning member has an aperture therein which fits over the guide portion with a spacing between the guide portion and the aperture to form a sliding gap therebetween, the sliding gap thereby creating a sliding portion of the aligning member which allows a sliding action when the aligning member moves on the guide portion;
    wherein the sliding gap of the sliding portion is formed such that a leading end side sliding gap proximate a turntable side in a sliding direction of the aligning member differs in size from a trailing end side sliding gap proximate a disk recording medium side in the sliding direction, whereby the difference in size allows the alignment member to pivot relative to the turntable about an axis generally perpendicular to the axis of the rotation shaft; and
    wherein the leading end side sliding gap is formed smaller than the trailing end side sliding gap.

2. The aligning device according to claim 1, wherein the sliding gap between the aligning member and the guide portion is formed having a tapered shape tapering in the sliding direction of the aligning member from the disk recording medium side toward the turntable side.

3. The aligning device according to claim 1, wherein the sliding gap between the aligning member and the guide portion forms at least two sliding portions on the aligning member such that the leading end side sliding gap becomes smaller than the trailing end side sliding gap.

4. An information recording/reproducing apparatus that performs information recording/reproducing to a disk recording medium using an optical beam, comprising:
    an aligning device according to claim 1;
    a spindle motor having said aligning device installed thereon for rotating the recording medium; and
    an optical pickup that radiates an optical beam to the rotating recording medium.

* * * * *

UNITED STATES PATENT AND TRADEMARK OFFICE
CERTIFICATE OF CORRECTION

| | |
|---|---|
| PATENT NO. | : 7,363,641 B2 |
| APPLICATION NO. | : 10/957838 |
| DATED | : April 22, 2008 |
| INVENTOR(S) | : Shinnosuke Torii |

It is certified that error appears in the above-identified patent and that said Letters Patent is hereby corrected as shown below:

TITLE PAGE AT (75) INVENTORS

"Shinnosuke Torii, Tokyo (JP)" should read --Shinnosuke Torii, Kawasaki (JP)--.

COLUMN 1

Line 29, "is" should read --are--.

COLUMN 2

Line 43, "the-disk" should read --the disk--.

COLUMN 6

Line 65, "becomes" should read --become--.

COLUMN 8

Line 28, "becomes" should read --become--.

COLUMN 9

Line 14, "member 31" should read --member 3--.

Signed and Sealed this

Thirtieth Day of September, 2008

JON W. DUDAS
*Director of the United States Patent and Trademark Office*